June 11, 1946.   W. G. GRIMES   2,401,867
INSTRUMENT LIGHT
Filed Jan. 26, 1944
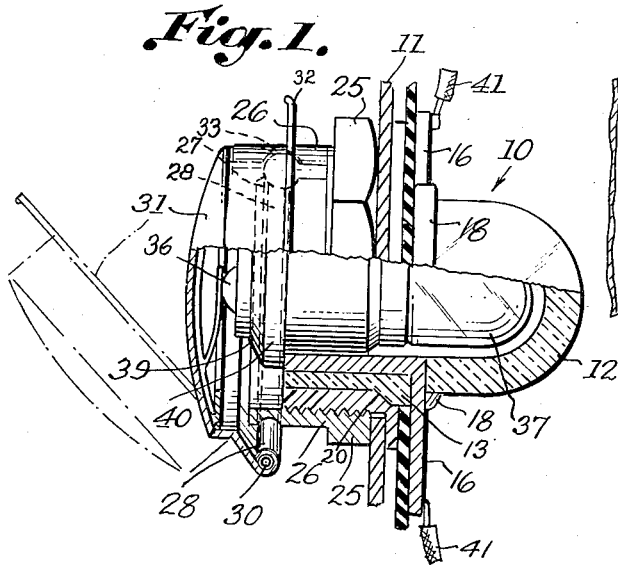
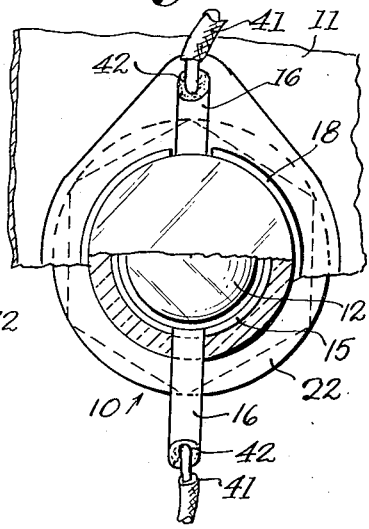
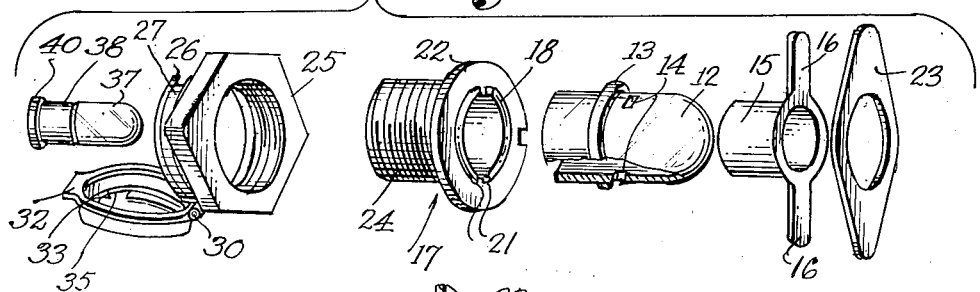
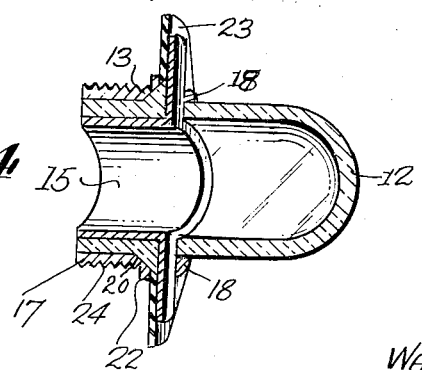
INVENTOR.
WARREN G. GRIMES
BY Miller & Miller
ATTORNEYS.

Patented June 11, 1946

2,401,867

UNITED STATES PATENT OFFICE 2,401,867

INSTRUMENT LIGHT

Warren G. Grimes, Urbana, Ohio

Application January 26, 1944, Serial No. 519,801

6 Claims. (Cl. 177—329)

This invention relates to an instrument light, and has for an object to provide an improved instrument light especially adapted for use in lighting instruments in vehicular instrument boards, and particularly in aircraft instrument boards.

A further object of this invention is to provide an instrument light which is extremely small in size and weight both for the purpose of eliminating unnecessary weight and for the purpose of enabling it to be mounted for either direct or indirect lighting of the instruments on the board.

A further object of this invention is to provide a light having a suitable housing for a lamp that is so small, about the size of a peanut kernel or less, that it is not provided with the usual thread or bayonet type of mounting in its fixture.

A further object of this invention is to provide a housing or fixture for a small lamp which housing or fixture will hold the lamp securely in position for mounting it and for completing the circuit therethrough, and at the same time is of such construction that the lamp can easily and quickly be removed and replaced whenever necessary without using any tools.

A further object of this invention is to provide a lamp housing or fixture that may be quickly and easily secured to any instrument board or panel by merely making a suitable aperture therethrough and fastening the housing to the board or panel by means of a part of the housing assembly.

A further object of this invention is to provide an instrument light of such small size that it provides only sufficient light for enabling the instrument to be seen, and avoids any excess light that tends to make it difficult for the operator or pilot of an aircraft to see ahead and guide his vehicle.

A further object of this invention is to provide a small instrument light especially suitable for "dark adaptation" usage, in that the lamp lens may be of the suitable red color that enables the pilot to read the instrument without causing any contraction of the pupils of his eyes and enables him to see ahead of the vehicle as clearly as though his eyes had been exposed only to darkness for at least half an hour or more, for, as well known, even partial exposure of the eyes to ordinary artificial light diminishes the keenness of one's eyes when peering into the dark for about the first half-hour after such exposure.

With the foregoing and other objects in view, as will hereinafter become apparent, this invention includes the combinations, constructions and arrangements of parts hereinafter set forth, disclosed and illustrated on the accompanying drawing, wherein:

Fig. 1 is a partly sectional side view of the instrument light of this invention, as mounted through an instrument board or panel;

Fig. 2 is a similar but top view;

Fig. 3 is a perspective exploded view, and

Fig. 4 is a perspective sectional view of the lens assembly.

There is shown at 10 the assembled instrument light of this invention mounted in position through an instrument board or panel 11. The instrument light 10 includes a lens 12, shaped substantially as shown, and is made of an insulating transparent or translucent material, such as a plastic of the proper red color for "dark adaptation." This lens 12 is provided with a ledge 13 extending about its waist, and immediately above its waist ledge 13 is a pair of diametrically opposite apertures 14. Located internally of the lens 12 is a terminal sleeve 15 which extends from the open end of the lens 12 to the apertures 14, and integrally extending from the terminal sleeve 15 through the apertures 14 is a pair of terminal soldering lugs 16 normal to the axis of the terminal sleeve 15 and the lens 12.

An externally threaded lens shell 17 is placed about the lens 12 between the ledge 13 and the open end of the lens. The ledge end of the lens shell 17 is provided with a pair of diametrically opposite less than semi-circular lips 18 which are folded over to embrace the ledge 13 and hold the lens shell 17 securely on the lens 12. The lens shell 17 is internally beveled as at 20 to fit against the ledge 13. The ends 21 of the lips 18 are far enough apart that the terminal soldering lugs 16 may extend between them without danger of any electrical contact therebetween. Below the lips 18, the lens shell 17 is provided with an external flange 22. A somewhat diamond shaped insulating washer 23 is placed between the flange 22 and the soldering lugs 16 and its opposite points extend at least slightly beyond the ends of the lugs 16. The lens shell 17 is provided with the external thread 24. The lens assembly thus far described is shown completely in Fig. 4, and it will be noted that the washer 23 and the lens 12 insulate the sleeve 15 with its lugs 16 from the lens shell 17 with its lips 18 and flange 22.

Adapted to be threaded on the lens shell 17 of the lens assembly, is a nut 25 of a lamp retaining cap assembly. This nut 25 has an integrally extending neck 26 provided with a circumferential groove 27. Mounted in this groove 27 is a slightly yieldable ring 28 having an extending portion providing hinge pivot 30 for a lamp retaining cap 31. This cap 31 has a peak 32 for enabling the same to be easily opened and closed, and inside the peak 32 is a slight undercut 33 for cooperation with the ring 28 for holding the cap 31 closed against accidental opening. Within this cap 31 is yieldable contact spring 34. This spring 34 as shown consists of a radially extending tongue of a flat ring 35. When the cap is closed, this spring 34 presses against the center contact 36 of a peanut-kernel-sized lamp 37. The lamp 37 has a cylindrical contact 38 having an externally extending flange 40 which is separated by insulation 39 from the center contact 36. The external diameter of the lamp cylindrical contact 38 is very slightly less than the internal diameter of the terminal sleeve 15.

In operation, the instrument light 10 is mounted on the panel 11 by having the assembly shown in Fig. 4 placed through an appropriate aperture in the panel 11 until the lens shell flange 22 abuts on surface of the panel. Nut 25 is then threaded on the threads 24 of the lens shell 22 until it abuts the other surface of the panel 11. Next, insulated conductor wires 41, forming part of the lamp circuit, are soldered to the terminal lugs 16, as at 42. The lamp 37 is then inserted through the open end of the sleeve terminal 15 until its flange 40 abuts the end of sleeve terminal 15, and then cap 31 is closed, bringing its tongue spring 34 tight against the lamp center contact 36, thus holding the lamp 37 firmly in position within the instrument light 10. Any number of these instrument lights 10 may thus be connected in parallel, the circuit passing from the conductor wires 41 through lugs 16 and terminal sleeve 15 to the lamp cylindrical contact flange 40, through the lamp 37 to its center contact 36 to the tongue spring 34 and through cap 31 and nut 25 which grounds it through panel 11 back to a switch and the source of electrical power.

While the device has been shown and the structure described in detail, it is obvious that this invention is not to be considered limited to the exact form described, and that changes may be made therein within the scope of what is claimed, without departing from the spirit of the invention.

Having thus set forth and disclosed the nature of this invention, what is claimed is:

1. An instrument light comprising a lens assembly, a flanged concentric contact and center contact lamp, and a lamp retaining cap assembly; said lens assembly including a lens, a flanged and threaded lens shell, a lamp flanged contact terminal, and said lamp retaining cap assembly including a lamp center contact terminal yieldably holding said lamp within said lens with its flanged concentric contact abutting said lens assembly terminal, a cap in which said lamp holding terminal is mounted, a nut on which said cap is pivotally hinged, said nut cooperating with said lens shell flange for mounting the instrument light through an instrument panel, said lens assembly terminal comprising terminal means within said lens, insulated from said lens shell by the material of said lens, and extending through said lens, beyond said lens shell, for connection to a power supply.

2. An instrument light comprising a lens assembly, a flanged concentric contact and center contact lamp, and a lamp retaining cap assembly; said lens assembly including a lens, a flanged and threaded lens shell, a lamp flanged contact terminal, and said lamp retaining cap assembly including a lamp center contact terminal yieldably holding said lamp within said lens with its flanged concentric contact abutting said lens assembly terminal, a cap in which said lamp holding terminal is mounted, a nut on which said cap is pivotally hinged, said nut cooperating with said lens shell flange for mounting the instrument light through an instrument panel, said lens assembly terminal comprising a sleeve within said lens insulated from said lens shell by the material of said lens, a terminal lug extending integrally from said terminal sleeve through said lens for connection to a power supply, and an insulation washer separating said lug from said lens shell, said nut of said lamp retaining cap assembly including an integrally extending neck having a circumferential groove therein, a ring partly countersunk in said groove, a hinge pivot for said cap mounted on said ring, said cap being closable over said ring to retain said cap in closed position.

3. An instrument light comprising a lens assembly, a flanged concentric contact and center contact lamp, and a lamp retaining cap assembly; said lens assembly including a lens, a flanged and threaded lens shell, said lamp retaining cap assembly including a cap, a nut on which said cap is pivotally hinged, said nut cooperating with said lens shell flange for mounting the instrument light through an instrument panel, said lens assembly terminal comprising a sleeve within said lens insulated from said lens shell by the material of said lens, a terminal lug extending integrally from said terminal sleeve through said lens for connection to a power supply, said nut of said lamp retaining cap assembly including an integrally extending neck having a circumferential groove therein, a ring partly countersunk in said groove, and a hinge pivot for said cap mounted on said ring, said cap being closable over said ring to retain said cap in closed position.

4. An instrument light comprising a lens assembly, a flanged concentric contact and center contact lamp, and a lamp retaining cap assembly; said lens assembly including a lens, a flanged and threaded lens shell, a lamp flanged contact terminal, and said lamp retaining cap assembly including a lamp center contact terminal yieldably holding said lamp within said lens with its flanged concentric contact abutting said lens assembly terminal, a cap in which said lamp holding terminal is mounted, a nut on which said cap is pivotally hinged, said nut cooperating with said lens shell flange for mounting the instrument light through an instrument panel, said lens assembly terminal comprising a sleeve within said lens insulated from said lens shell by the material of said lens, a terminal lug extending integrally from said terminal sleeve through said lens for connection to a power supply, said nut of said lamp retaining cap assembly including an integrally extending neck having a circumferential groove therein, a ring partly countersunk in said groove, and a hinge pivot for said cap mounted on said ring, said cap being closable over said ring to retain said cap in closed position.

5. An instrument light comprising a lamp lens of insulating material, a ledge extending about the waist of said lens, a terminal sleeve located within said lens extending from the open end of said lens, terminal lug means extending integrally from said terminal sleeve through said lens in a direction normal to the axis thereof, and adapted to have conduit wires secured thereto, a threaded lens shell located externally of said lens and abutting said lens ledge, an externally extending flange on said shell adjacent the ledge end of said shell, ledge embracing lip means extending from the end of said shell to hold said shell firmly in position, an insulating washer located between and separating said terminal lug means from said shell flange, a threaded nut adapted to cooperate with said threaded lens shell, a hollow neck integrally extending from said nut, said neck having a circumferential groove thereabout, a ring mounted in said groove, a hinge pivot provided by said ring, a cap pivotally mounted on said hinge pivot, a spring mounted centrally within said cap, and a center contact lamp having a flanged cylindrical contact adapted to be held within said lens by said cap mounted spring abutting against its lamp center contact to press the lamp flange contact against the end of said lens terminal sleeve to complete a circuit from the terminal lug means through the lamp and lamp retaining cap and nut to a panel in which the instrument light is mounted by the nut abutting one panel surface while the shell flange abuts the other panel surface.

6. An instrument light comprising a lamp lens of insulating material, a ledge extending about the waist of said lens, a terminal sleeve located within said lens extending from the open end of said lens, terminal lug means extending integrally from said terminal sleeve through said lens in a direction normal to the axis thereof and adapted to have conduit wires secured thereto, a threaded lens shell located externally of said lens and abutting said lens ledge, an externally extending flange on said shell adjacent the ledge end of said shell, a pair of ledge embracing lips extending from the end of said shell to hold said shell firmly in position, an insulating diamond shaped washer located between and separating said terminal lugs from said shell flange, a threaded nut adapted to cooperate with said threaded lens shell, a hollow neck integrally extending from said nut, said neck having a circumferential groove thereabout, a ring mounted in said groove, a hinge pivot provided by said ring, a cap pivotally mounted on said hinge pivot, a peak on said cap opposite the hinged side of said cap for opening and closing said cap about said neck and ring, an undercut within the peak side of said cap for cooperation with said ring to hold said cap in closed position, a spring mounted centrally within said cap, said spring being a radial tongue on a flat ring within said cap, and a center contact lamp having a flanged cylindrical contact adapted to be held within said lens by said cap mounted spring abutting against its lamp center contact to press the lamp flange contact against the end of said lens terminal sleeve to complete a circuit from the terminal lug means through the lamp and lamp retaining cap and nut to a panel in which the instrument light is mounted by the nut abutting one panel surface while the shell flange abuts the other panel surface.

WARREN G. GRIMES.